Jan. 5, 1932. J. R. WILLIAMS 1,839,630
DAMPER CONTROL FOR HOUSE HEATING SYSTEMS
Filed March 24, 1930
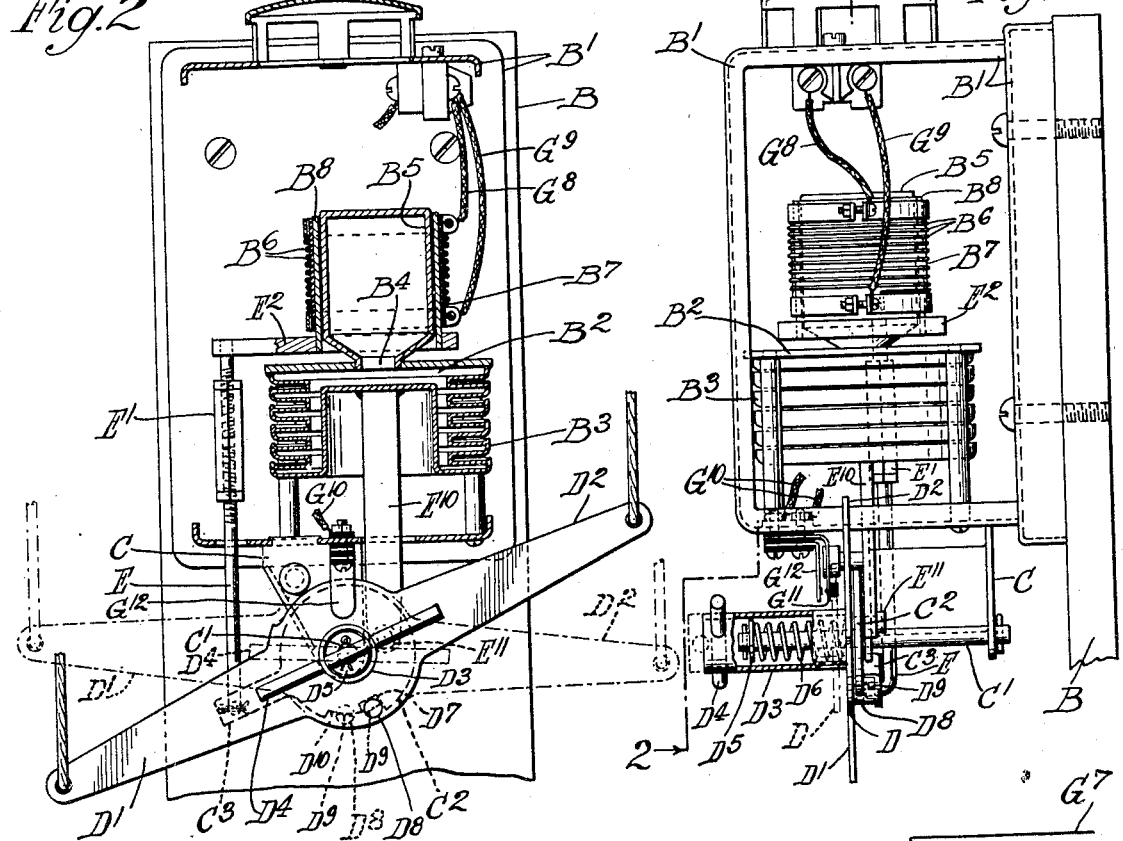
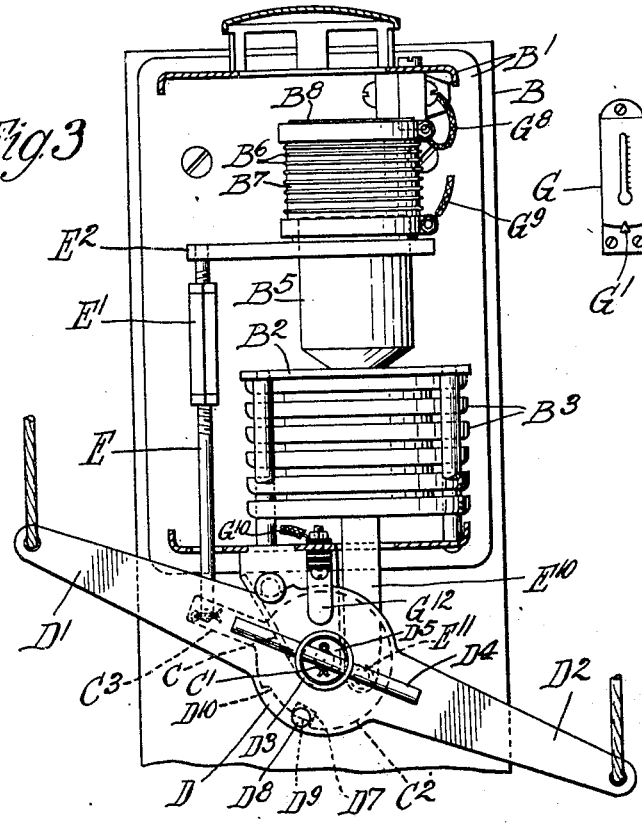
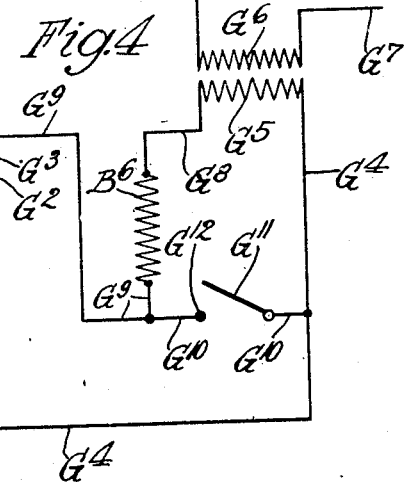
Inventor
James R. Williams
by Parker & Carter
Attorneys Patented Jan. 5, 1932

1,839,630

UNITED STATES PATENT OFFICE

JAMES R. WILLIAMS, OF QUINCY, ILLINOIS, ASSIGNOR TO H. M. SHEER COMPANY, OF QUINCY, ILLINOIS, A CORPORATION OF ILLINOIS

DAMPER CONTROL FOR HOUSE HEATING SYSTEMS

Application filed March 24, 1930. Serial No. 438,270.

My invention relates to an improvement in damper controls for house heating systems and the like, and has for one object to provide, in connection with a thermostatic control or automatic damper operating motor mechanism, means whereby an operator working on the furnace at a point removed from the automatic control, may manipulate the damper operating mechanism in such manner as to permit closing of the damper for coaling of the furnace without change in the balance of the apparatus, and whereby such control will automatically throw back into normal operation after a predetermined interval. Another object is the provision of means for varying the amount of heat effective to control a heat motor for actuating the damper and draft control. Another object is to render such variation responsive to the position of a controlling lever or levers for such damper or draft control. Other objects will appear from time to time in the course of the specification and claims.

I illustrate my invention more or less diagrammatically in the accompanying drawings, wherein—

Figure 1 is a side elevation;

Figure 2 is a section on the line 2—2 of Figure 1;

Figure 3 is a front elevation with parts in section; and

Figure 4 is a wiring diagram.

Like parts are indicated by like symbols throughout the specification and drawings.

Referring to the drawings, B generally indicates a panel or base upon which is mounted the housing $B^1$ for the control mechanism below described. The mechanism includes a fluid motor having the expansion chamber $B^2$ with the flexible bellows $B^3$. Communicating with the space between the members $B^2$ $B^3$ is the passage $B^4$ which in turn communicates with the heating cylinder or tube $B^5$. It will be understood that any suitable liquid or fluid which expands and contracts readily in response to changes in temperature may be employed. Any suitable means for heating the chamber $B^5$ may be employed, and I indicate for example the resistance or heating coil $B^6$ which may be wound upon the insulating covering or tube $B^7$, which in turn is positioned about the sliding sleeve $B^8$ which is longitudinally slidable upon the cylinder or tube $B^5$.

Positioned adjacent the heat motor so described is a pivot bracket C upon which may be any suitable pivot pin $C^1$. Mounted upon the pin $C^1$ is a hub or plate $C^2$. In the present instance the plate and pin are held against relative rotation, and the pin rotates. If desired, the pin could be held against rotation, and the hub or plate mounted to rotate upon it. Mounted for rotation in relation to pin and plate is a lever hub D having arms $D^1$ $D^2$ herein shown as integral with it. Associated with the hub and preferably held against movement in relation to it is the sleeve $D^3$ with the cross arm or handle $D^4$. It will be understood that the hub D and the sleeve $D^3$ are slidable as a unit along the pin $C^1$. $D^5$ indicates an abutment at the end of the pin $C^1$ and $D^6$ a spring compressed between said abutment and the hub D. Said spring normally reaches the hub D toward the right, referring to the parts in the position in which they are shown, in Figure 1. The operator may manually withdraw the sleeve $D^3$ to the left, by use of the handle $D^4$. $D^7$ indicates a notch in the hub $C^2$ and $D^8$ a pin on the hub D adapted to penetrate said notch, when the positions are in the full line position of Figure 1. When in such position, the spring $D^6$ prevents lateral movement of the hub D, and the levers $D^1$ and $D^2$ move in unison with the movement of the hub or disc $C^2$. The pin $D^8$ is cut away as at $D^9$, the cut away portion being of such size as to clear the indented or reduced portion $D^{10}$ of the disc $C^2$, which reduced portion abuts or is in communication with the notch $D^7$, but is of greater radius. When the parts are in the dotted line position in which they are shown in Figure 1 and when the hub D is rotated slightly in relation to the hub $C^2$, the base portion or completely round portion of the pin $D^8$ overrides the hub $C^2$, and serves as a spacing means, to hold the hub D and the parts in the dotted line position of Figure 1.

E indicates a link or rod pivoted to the lever $C^3$, which may be integral with the plate or hub $C^2$. This rod is indicated as extensible, as by the interposition between its ends of the screwthreaded sleeve $E^1$. The upper end of the rod E is in engagement with the cross bar or connecting member $E^2$ which in turn is in communication with the sliding sleeve $B^8$.

Referring to the wiring diagram of Figure 4, G indicates any suitable room thermostat with the control setting member $G^1$. $G^2$ $G^3$ are terminals associated with the thermostat. $G^4$ indicates a conductive connection extending from the terminal $G^2$ to the secondary coil $G^5$ of a transformer. $G^6$ is a primary coil in circuit with the power lines $G^7$, which may be actuated by any suitable source of electric power. $G^8$ indicates a conductive connection between the secondary coil $G^5$ and the resistance $B^6$. $G^9$ indicates a conductive connection between the terminal $G^3$ of the thermostat and the resistance $B^6$. Shunted across the lines $G^4$ and $G^9$ is a conductive connection $G^{10}$ in which is interposed the switch member $G^{11}$ and its opposed fixed contact $G^{12}$.

Relating the wiring diagram to the other figures the fixed terminal $G^{12}$ is shown in Figure 1, and the moving switch member $G^{11}$ opposed to it. When the parts are moved to the dotted line position the hub D moves the switch member $G^{11}$ into contact with the terminal $G^{12}$ and closes a circuit through the resistance $B^6$, independent of the thermostat G. In other words even though the room thermostat is set at a temperature lower than the room temperature, so that the circuit through the resistance $B^6$ is normally broken, the manual withdrawal of the parts to the dotted line position of Figure 1 will close the switch $G^{11}$ and actuate the resistance $B^6$.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

In a thermostat operated control for a domestic heating plant, the operation is made to depend upon temperature conditions more or less remote from the heating plant, as by the use of a thermostat responding to temperature conditions in a dwelling house. In supplying solid fuel to a domestic heating plant, the operator who stokes the furnace normally closes the check, if it is open, when he stokes. The present invention is directed to permit the operator to interrupt, in this fashion, the normal thermostatic control of drafts and check, while insuring that this interruption shall not be permanent. Unless means are provided for terminating this manual interruption of the normally automatic thermostatic control, the operator may go off and leave the furnace, and forget to return it to automatic control position. Referring in detail to the operation of the present device, assume that the levers $D^1$ $D^2$ are in the full line position in which they are shown in Figure 2, with the pin $D^8$ engaging the notch $D^7$, and the levers responsive to the normal thermostatic control through the heat motor. In this full line position, assume that the draft is closed and the check open, and that the operator wishes to open the draft, while stoking the furnace. The operator grasps the cross handle $D^4$, withdraws the sleeve $D^3$ until the un-mutilated portion of the pin $D^8$ clears the hub $C^2$. He then turns the handle in clockwise fashion, putting the levers in the dotted line position of Figure 2, with the un-mutilated portion of the pin $D^8$ abutting against the face of the hub $C^2$. The levers $D^1$ $D^2$ are thereby dissociated from their normal fixed relationship in relation to the hub $C^2$. At the same time the withdrawal of the sleeve has closed the circuit through the fixed contact $G^{12}$ and the switch member $G^{11}$, as above explained, and the resistance $B^6$ is actuated. This actuation of the resistance $B^6$ is independent of the normal thermostatic control, and serves to expand the heat motor. The actuating connection $E^{10}$, pivoted as at $E^{11}$ to the hub $C^2$ causes the hub to rotate in a clockwise direction, as the expansion member expands in response to the heating effect of the coil $B^6$. As this expansion is completed the hub $C^2$ overtakes the hub D, the pin $D^8$ is aligned with the slot $D^7$, and the spring $D^6$ then moves the parts back into the full line position of Figure 1. This breaks the circuit through the members $D^{11}$ $D^{12}$, and permits the resistance $B^6$ to cool. The consequent collapse of the expansion member gives a counter clockwise rotation to the hub $C^2$, and to the hub D and its associated levers, which are again moving as a unit with the hub. This counter clockwise movement again closes the draft and opens the check, until thermostatic actuation of the resistance $B^6$ again rotates the hub $C^2$ and D and the associated levers $D^1$ $D^2$.

A characteristic feature of the invention herein described is the movable relation of the resistance $B^6$ to the heating chamber. The importance of this movable relation rests in the fact that it varies the subjection of the heating chamber to heat in response to the expansion and contraction of the expansible chamber. Assume that the parts are in full line position in which they are shown in Figure 2 and that the thermostat, in response to a drop in the room temperature, closes a circuit through the resistance B⁶. The resistance is actuated, and the entire area of the resistance is aligned with the wall of the heating chamber B⁵. I may employ a coil of considerable area and heating effect which rapidly heats the fluid in the heat motor system and causes a quick expansion of the bellows. The member E¹⁰ then rotates the hub C² and with it the levers D¹ D² and C³. As the lever C³ rises, it lifts the resistance B⁶, thus subjecting the fluid in the system to a progressively smaller heating effect, and in effect, damping down the heat as the need for the heat reduces. Eventually the parts reach the position of Figure 3, and the fluid in the system is subjected to the effect of only a small part of the coil B⁶. A balance is maintained, however, as any cooling of the system tends to rotate the levers D¹ C² counter clockwise, thus increasing the effective heating area or length of the coil B⁶. I am thus able to employ a highly efficient coil, of greater heating efficiency than I could employ if the coil were in permanent relation to the heating chamber. This excess heating effect is sufficient to provide the quick starting which is an important feature of my device, and the consequent movement of the lever reduces the heating area to a normal requirement for maintaining the levers in the full line position of Figure 3 until the increased heating effect of the furnace raises the room temperature sufficiently to throw off the thermostat and break the heating circuit through the coil B⁶. By forming the tube B⁵ with a large diameter at the top the return action of the bellows is faster than would be possible with a relatively more slender tube. A greater volume of liquid is present in proportion to the area of the walls of the tube than would be the case with a more slender tube. From this a quicker condensation of the vapor results when current is turned off of the resistance element and thus a more rapid action in opening the check door of the furnace occurs when the thermostat circuit is broken.

I claim:

1. In a vapor motor, a closed system including a work chamber and a communicating heating chamber positioned to collect vapors formed within the system, a fluid within said system, and means for heating it, including a heating element associated with said heating chamber, and means for moving said heating element in relation to said heating chamber in response to changes in pressure within the vapor motor system.

2. In a vapor motor, a closed system including a work chamber and a communicating heating chamber, a movable member associated with the work chamber and adapted to move in response to variations of pressure within the vapor motor system, a fluid within said system, and means for heating it, including a heating element associated with said heating chamber, and means for moving said heating element in relation to said heating chamber in response to movement of said movable member to vary the amount of heat transferred from the heating element to the fluid while constantly maintaining the same in heat transfer relation.

3. In a vapor motor, a work chamber, a movable member associated with said work chamber and adapted to move in response to variation of pressure within said work chamber, a work performing member positioned adjacent said chamber, an actuating connection between said movable member and said work performing member, a fluid within said chamber and means for heating it, including a heating chamber in communication with the work chamber and positioned to collect vapors formed within the system, a heating element associated with said heating chamber and means for moving said heating element, in relation to said heating chamber, in response to movement of the work performing member to vary the amount of heat transferred from the heating element to the fluid while constantly maintaining the same in heat transfer relation.

4. In a vapor motor, a work chamber, and a heating chamber in communication therewith, a fluid within the system so formed, and means for heating it including a heating member slidably mounted upon said heating chamber, and means for moving said heating member along said heating chamber in response to variations in pressure within the vapor motor system.

5. The structure of claim 4 characterized by the employment, as a heating member, of an electric resistance and means for passing an actuating current therethrough.

6. The structure of claim 4 characterized in that, in response to such movement of the heating member, the area of the heating chamber subjected to heating action is increased in response to decreases of pressure within the vapor motor system and decreased in response to increases.

7. In a draft control, a vapor motor, and a heating chamber therefor, a movable element adapted to move in response to changes in pressure condition within the vapor motor, a work performing member and an actuating connection between said work performing member and the movable member, heating means associated with the heating chamber, and movable in relation thereto, and means for moving said heating means in response to movement of said work performing member to vary the amount of heat transferred from the heating element to the fluid while constantly maintaining the same in heat transfer relation.

8. The structure of claim 7 characterized by the employment of an electrical resistance positioned adjacent said heating chamber and movable in relation thereto.

9. The structure of claim 7 characterized by the employment of an electrical resistance positioned adjacent said heating chamber and movable in relation thereto, an actuating circuit therefor and a thermostatic control in said actuating circuit.

10. The structure of claim 7 characterized by the employment of an electrical resistance positioned adjacent said heating chamber and movable in relation thereto, an actuating circuit therefor and a thermostatic control in said actuating circuit, and additional means for closing said actuating circuit, independent of said thermostatic control.

11. In a vapor motor, a closed chamber, a fluid within the chamber, means for heating the fluid including an annular heating element telescopically associated with the chamber, and means for relatively moving the chamber and heating element in response to pressure variation within the chamber to vary the degree of telescopic engagement between the heating element and chamber.

12. In a vapor motor, a closed tubular chamber, a fluid within the chamber, means for heating the fluid including a tubular coil of resistance wire surrounding the chamber, a suitable source of electric potential associated with the coil, the coil and chamber being relatively movable telescopically, and means for relatively moving the coil and chamber in response to pressure variations within the chamber to vary the degree of telescopic engagement therebetween.

Signed at Quincy, county of Adams, and State of Illinois, this 20th day of March, 1930.

JAMES R. WILLIAMS.